June 22, 1965  J. W. ROSZAK  3,190,026
TIP-UP WITH LIGHTING ATTACHMENT FOR FISHING DEVICES
Filed Dec. 17, 1962
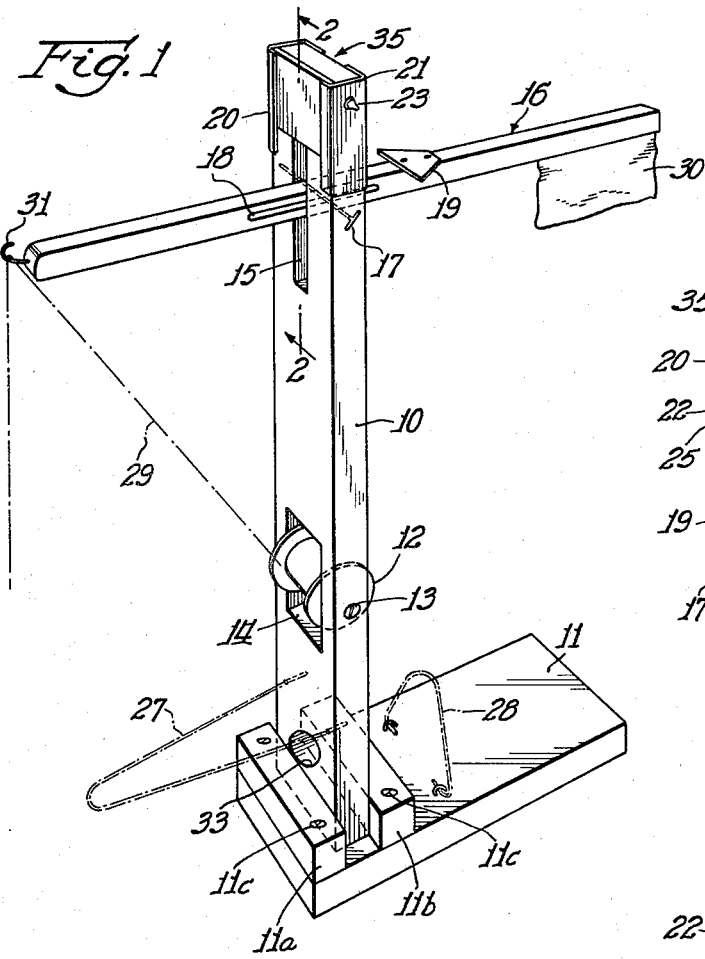
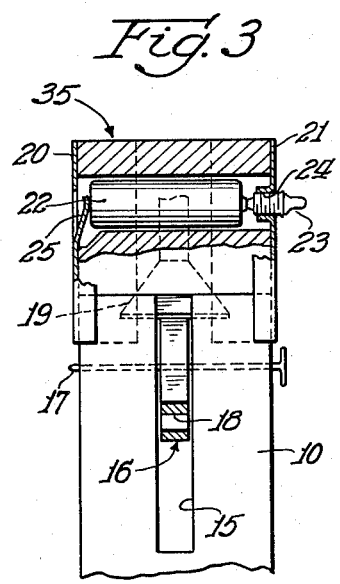
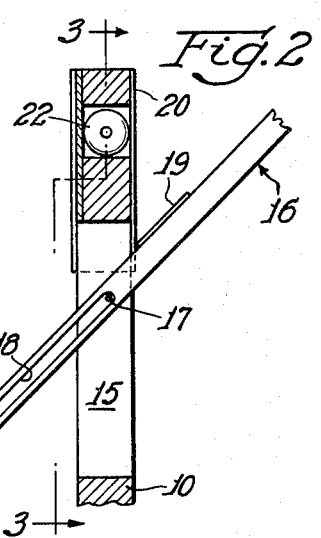
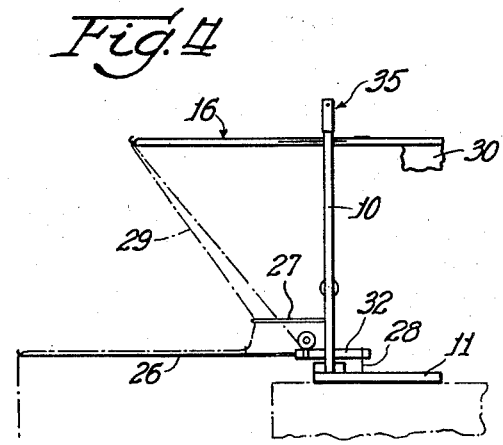
Inventor:
John W. Roszak
By: Roger Schmiege Atty.

United States Patent Office 3,190,026
Patented June 22, 1965

3,190,026
TIP-UP WITH LIGHTING ATTACHMENT FOR FISHING DEVICES
John W. Roszak, 1718 S. 17th St., Sheboygan, Wis.
Filed Dec. 17, 1962, Ser. No. 245,072
5 Claims. (Cl. 43—17)

This invention relates to fishing apparatus and more particularly to a tip-up fishing apparatus which automatically displays a visible signal, either day or night, when a fish strikes or bites the bait on a fishing line attached thereto.

Prior to this invention, a great many fishing tip-ups were provided with a variety of lighting attachments as well as a variety of signaling devices to notify a fisherman that a fish had taken the bait. Generally, those tip-ups having light signals were provided with a spring or wires affixed to the upper portion of a vertical upright post. When a fish struck the bait, the spring or springs were released, and the spring or springs provided wire contact on a battery-operated light to signal the fisherman and let him know that there was a strike. Most of these tip-ups were provided with a cross-beam on the mid-section of an upright post, which beam was placed across an ice hole. Though the beam placed across the ice hole kept the tip-up in an upright position, the reel and line generally extended into the water.

While the tip-ups containing springs and wire attachments generally have provided adequate fishing apparatus when new, they were in many instances prone to excessive wear through the flexing of the spring or springs which in turn caused the springs to break or become too weak to function properly. Also, those tip-ups that were constructed so as to have the line and reel extend into the water had a tendency to become inoperable due to ice accumulation on the line and/or reel.

It is the purpose of this invention to provide a tip-up that is completely devoid of springs and which is neither prone to excessive wear nor to accidental discharge. Instead of the conventional use of springs, the tip-up of this invention is so conceived and devised as to be operated totally by gravity. Thus by changing the fulcrum point on a flag cross-beam, the cross-beam under the effects of gravity is caused to slide forward and provide positive contact on electrode plates of a battery holder which in turn causes a signal light to turn on.

Another outstanding feature of this invention is that the reel and entire tripping mechanism of the tip-up is at all times above water. Thus, the tip-up is not prone to become inoperable as a result of ice accumulation, corrosion of the parts, or the like. Further, the tip-up of the present invention may be economically constructed of readily available materials such as wood, plastic, metal, or the like; and due to lack of wear, it will last indefinitely.

The accompanying drawing illustrates one embodiment of a tip-up constructed in accordance with the principles of this invention and is illustrative of the manner in which this invention may be utilized.

FIGURE 1 is a perspective view of the tip-up having the lighting apparatus of this invention attached thereto;

FIGURE 2 is a partial horizontal cross-sectional view taken along lines 2—2 of FIGURE 1;

FIGURE 3 is a partial sectional elevational view taken along lines 3—3 of FIGURE 2; and FIGURE 4 is an elevational view of the invention showing the invention when used in conjunction with a fishing rod.

Referring now more particularly to the drawings, there is shown a tip-up comprised of a vertical upright post 10 attached to a base portion 11. Base portion 11 is equipped with two upright members 11a and 11b which stabilize post 10 and prevent horizontal movement. Members 11a and 11b are attached to base member 11 by screws 11c. There is a reel 12 rotatably attached to a slotted opening 14 on post 10 by a pin 13. Slot 14 may be situated anywhere between the upper and lower end of post 10, but it is conveniently situated midway therebetween. On the upper end of post 10 (as shown in FIGURE 1), there is a vertical slot 15 within which a flag cross-beam 16 is slidably and pivotally mounted on a fulcrum pin 17. Flag cross-beam or cross-piece 16 is provided with a slot 18 along its mid section in which fulcrum pin 17 is allowed to slide. There is a switch member 19 comprised of an electrically conductive metal attached to the upper surface of flag cross-beam 16 to the right of slot 18 as shown in FIGURE 1. Switch member 19 is situated so as to have contact with casement or closure members 20 and 21, both of the latter being attached to the upper end of post 10 when the flag is in a vertically upright position. The electrically conductive piece of metal comprising switch member 19 is shown in trapezoidal form in FIGURE 1. Flag cross-beam 16 has a flag 30 on its right end and a line securing means 31 on its left end, as shown in FIGURE 1. Guide-pin 31 retains line 29 which extends from spool 12. Line 29 has a fishing bait attached thereto (not shown).

On the uppermost portion of post 10 is a signal light 35 comprised of electrically conductive casement or closure members 20 and 21 which enclose each end of a dry cell battery 22. Casement or closure member 21, shown on the right side of post 10 in the perspective view of FIGURE 1 and sectional view of FIGURE 3, has a bulb 23 threadably engaged in an opening 24 thereof. casement member 20 has a broken away portion 25 which is bent inwardly as shown in FIGURE 3 which portion 25 provides pressure on the battery 22 to place battery 22 in contact with bulb 23.

FIGURE 4 shows the invention used in conjunction with a fishing rod 26 and shows the use of a guide wire 27 (shown in broken lines in FIGURE 1). Fishing rod 26 is retained in position by means of a guide loop 28 situated to the right of post 10. It may be noted that the handle 32 of rod 26 extends through a hole 33 in the upright post 10. Hole 33 is best illustrated in FIGURE 1.

FIGURE 2 shows the flag cross-beam 16 in a position which is obtained when there has been a pull on line 29 which has caused the flag cross-beam 16 to move downwardly on its left end, i.e., in a counterclockwise direction. Slot 18 thus has moved to the left to a point where pivot pin 17 on post 10 engages the right-most portion of slot 18 on beam 16. In this position, the switch member 19 on flag crossbeam 16 is in contact with casement members 20 and 21. The contact between the casement member 20 and 21 electrically connects the bulb 23 to the battery 22, thus causing bulb 23 to light.

This invention has been described in conjunction with a specific embodiment as illustrated in FIGURES 1 through 4. It should be noted, however, that the position and configuration of reel 12, cross-piece 16, and battery casement members 20 and 21 may be altered without departing from the spirit and scope of the invention. For example, the battery 22 and casement members 20 and 21 may be situated beneath the vertical slot 15 of post 10 as long as switch member 19 will provide contact between members 20 and 21 when the flag 30 on flag cross-piece 16 is tipped upwardly by a downward pull on line 29. The base member 11 is shown as a rectangular flat piece of material; however, a circular or trapezoidal base among other configurations would be equally operable.

While this invention has been described in connection with a certain specific embodiment thereof, it is to be understood that this is by way of illustration and not by way of limitation; and the scope of this invention is defined solely by the appended claims which should be construed as broadly as the prior art will permit.

I claim:
1. A tip-up comprising in combination:
an upright post,
a base member for supporting said post in a generally upright vertical position,
a line mounted on and secured to said upright post,
a lighting means attached to said post, said lighting means including spaced contacts in the form of closure members on either side thereof, and
a cross-beam having a signal flag on one end, line securing means on the opposing end, and a switch member mounted thereon, said cross-beam pivotally and slidably mounted on said post, said switch member adapted to bridge said closure members on said lighting means, and energize said lighting means on said post when said one end is in a raised position and said opposing end is in a lowered position.

2. A tip-up comprising in combination:
an upright post,
a base member for supporting said post in a generally upright position,
a reel equipped with a line, said reel rotatably mounted on and secured to said upright post,
a lighting means attached to said post, said lighting means including two closure members and,
a cross-beam having a signal flag on one end, line securing means on the opposing end, and a switch member mounted thereon, said cross-beam pivotally and slidably mounted on said post, said switch member adapted to bridge said closure members and energize said lighting means when said one end is in a raised position and said opposing end in a lowered position.

3. A tip-up comprising in combination:
an upright post having an aperture in the lower portion thereof,
a base member adapted to retain said upright post in a generally upright position,
a reel equipped with a line, said reel rotatably mounted on said upright post,
a lighting means comprised of two closure members, a battery and a bulb, said lighting means attached to said post, and,
a cross-beam pivotally and slidably mounted on said post, said cross-beam having a signal flag on one end, line securing means on the opposing end, and switch member between said ends, said switch member adapted to bridge said closure members and energize said lighting means when said one end on said cross-beam is in a raised position and said opposing end is in a lowered position.

4. A tip-up comprising in combination:
an upright post having reel mounting means and cross-beam mounting means attached thereto,
a base member adapted to retain said upright post in an upright position,
a reel equipped with a line, said reel mounted on said reel mounting means of said post,
a lighting means characterized by being comprised of two closure members, a battery and a bulb, said lighting means attached to said post,
a cross-beam pivotally and slidably mounted on said cross-beam mounting means, said cross-beam having a flag signal on one end, line securing means on the opposing end, and a switch member between said ends, said switch member adapted to bridge said closure members and energize said lighting means on said post when said one end of said cross-beam is in an upright position and said opposing end is in a lowered position.

5. A tip-up comprising in combination:
an upright post having an aperture in the lower portion thereof,
a base member adapted to retain said upright post in an upright position,
a reel equipped with a line, said reel rotatably mounted on said upright post,
a lighting means comprised of two closure members, a battery and a bulb, said lighting means attached to said post, and,
a cross-beam, pivotally and slidably mounted on said post, said cross-beam having a signal flag on one end, line securing means on the opposing end, and a switch member between said ends, said switch member adapted to bridge said closure members and energize said light when said one end on said cross-beam is in a raised position, and said opposing end of said cross-beam is in a lowered position.

References Cited by the Examiner
UNITED STATES PATENTS

| | | | |
|---|---|---|---|
| 434,426 | 8/90 | Costellow | 43—17 |
| 446,596 | 2/91 | Hackett | 43—17 |
| 2,008,555 | 7/35 | Kovane | 43—16 |
| 2,714,270 | 8/55 | Premo | 43—17 |
| 2,786,294 | 3/57 | Whitacre | 43—17 |
| 2,917,858 | 12/59 | Ikeuchi | 43—17 |
| 3,120,072 | 2/64 | Rybarski | 43—17 |

ABRAHAM G. STONE, *Primary Examiner.*
NEIL C. READ, *Examiner.*